United States Patent [19]

Herchenbach et al.

[11] 4,323,397

[45] Apr. 6, 1982

[54] METHOD AND APPARATUS FOR THE THERMAL TREATMENT OF FINE-GRAINED MATERIAL WITH HOT GASES

[75] Inventors: Horst Herchenbach, Troisdorf; Hubert Ramesohl; Kunibert Brachthäuser, both of Bergisch-Gladbach, all of Fed. Rep. of Germany

[73] Assignee: Klockner-Humboldt-Deutz AG, Fed. Rep. of Germany

[21] Appl. No.: 242,396

[22] Filed: Mar. 10, 1981

Related U.S. Application Data

[62] Division of Ser. No. 26,610, Apr. 3, 1979.

[30] Foreign Application Priority Data

Apr. 10, 1978 [DE] Fed. Rep. of Germany ....... 2815461

[51] Int. Cl.$^3$ .............................................. C04B 7/36
[52] U.S. Cl. ..................................... 106/100; 432/13
[58] Field of Search .................. 106/100, 103; 432/13, 432/106

[56] References Cited

U.S. PATENT DOCUMENTS

| | | | |
|---|---|---|---|
| 3,957,521 | 5/1976 | Ritzmann | 106/100 |
| 4,022,629 | 5/1977 | Garrett et al. | 106/103 |
| 4,066,470 | 1/1978 | Brachthauser et al. | 106/100 |
| 4,123,288 | 10/1978 | Stringer et al. | 106/100 |
| 4,249,892 | 2/1981 | Brachthauser et al. | 106/100 |

*Primary Examiner*—James Poer
*Attorney, Agent, or Firm*—Hill, Van Santen, Steadman, Chiara & Simpson

[57] ABSTRACT

Method and apparatus for the thermal treatment of finely divided material for the calcination of cement wherein the material is preheated in a multi-stage heat exchanger and later passed to a calcining furnace. The material is partly deacidified in a pre-calcination zone before entering the sintering furnace where further calcining and sintering of the material is completed. A portion of the feed material is treated with rapidly oxidizing fuel components in a pre-calcination zone in a first stage and with more slowly oxidizing fuel components in a second stage, the more slowly oxidizing fuel components being a mixture of relatively fine granulated fuel particles of substantially uniform size and larger particles of briquetted or coarsely broken fuel.

7 Claims, 2 Drawing Figures

METHOD AND APPARATUS FOR THE THERMAL TREATMENT OF FINE-GRAINED MATERIAL WITH HOT GASES

CROSS-REFERENCE TO RELATED APPLICATION

This is a division of application of Ser. No. 26,610, filed Apr. 3, 1979.

This application has subject matter in common with an application filed in the names of Kunibert Brachthäuser and Horst Herchenbach, Ser. No. 932,902, filed Aug. 11, 1978, and assigned to the same assignee as the present application.

BACKGROUND OF THE INVENTION

1. Field of the Invention

This invention is in the field of heat treating materials for the calcination of cement and involves preheating the material in a heat exchanger, and then partially pre-calcining the material as it leaves the hottest stage of the multi-stage heat exchanger in separate stages, in one of which it is combined with rapidly oxidizing fuel components, and in the second of which it is treated with more slowly oxidizing fuel components which are carried over into the final calcination stage.

2. Description of the Prior Art

In the production of cement, it has been suggested that an additional calcination device be included in the gas conduit between a sintering furnace consisting of a rotary kiln and the associated heat exchanger system in order to carry out the deacidification of the raw material almost completely in the heat exchanger system. The rotary kiln is employed almost exclusively for the formation of clinker, i.e., burning of the material to completion. It is also known that the deacidification of a particle of raw material in suspension is dependent essentially upon the temperature, the duration of treatment, and the granulation or range of grain sizes.

Attempts to control the temperature have been made which involve adding fuel in finely divided form to the raw meal in the calcination device preceding the rotary kiln. In this way, a relatively uniform calcination of the raw material can be obtained. A disadvantage, however, was found in this connection that the fuel burns so rapidly that the raw meal particles are subjected to high temperatures in shock treatments. A deacidification of the particles of the meal is achieved to a certain degree, but because of the short period application of high temperatures, the cores of the particles of raw meal are not calcined. In addition, the formation of molten phases and deposit problems in the heat exchanger could not be prevented.

In the aforementioned co-pending application U.S. Ser. No. 932,902, there is described a means for controlling the deacidification of the calcium carbonate portion of the raw material for cement. The duration of treatment of the raw meal particles at high temperature is controlled by utilizing rapidly oxidizing fuel components in a first process stage of a separate calcination process, whereby the rapidly oxidizing fuel components give off their heat content completely, particularly to the finely divided portion of the raw meal. Slowly oxidizing fuel components are added to a separate calcination process in a second process stage, so that before the sintering occurs there is a further deacidification, particularly of the coarse portion of the raw meal. Because of the separate calcination processes there results a particularly long duration time for the material to be deacidified at a relatively high temperature level. With the process described in the aforementioned pending application, the temperature and duration time are so controlled that the deacidification of a particle of raw meal may be controlled and optimized to a substantial extent.

SUMMARY OF THE INVENTION

The present invention seeks to further improve the type of method and apparatus described and claimed in Ser. No. 932,902. Specifically, in accordance with the present invention the solid fuel which is used as the slowly oxidizing fuel is selected in accordance with a degree of oxidation velocity desired in the second stage of the separate precalcination process. It consists of a mixture of granulated and preferably pelletized fuel of relatively uniform particle size with briquetted and/or coarsely broken fuel. The problems associated with the utilization of solid fuels for the separate calcination process are overcome so that it becomes more convenient to control the temperature of the deacidification than possible with solid fuels having a wide spectrum of particle sizes. With the present invention, it is possible for the first time to provide representative indications as to burn-out time, the desired reactivity, and the most favorable ignition behavior of the solid, equally sized fuels. Upon utilization of such fuels, an exact control of the heat transfer to the particles of the raw meal in the calcination process is possible, thereby accurately controlling both the temperature and the duration of treatment.

DESCRIPTION OF THE PREFERRED EMBODIMENTS

Figure 1:
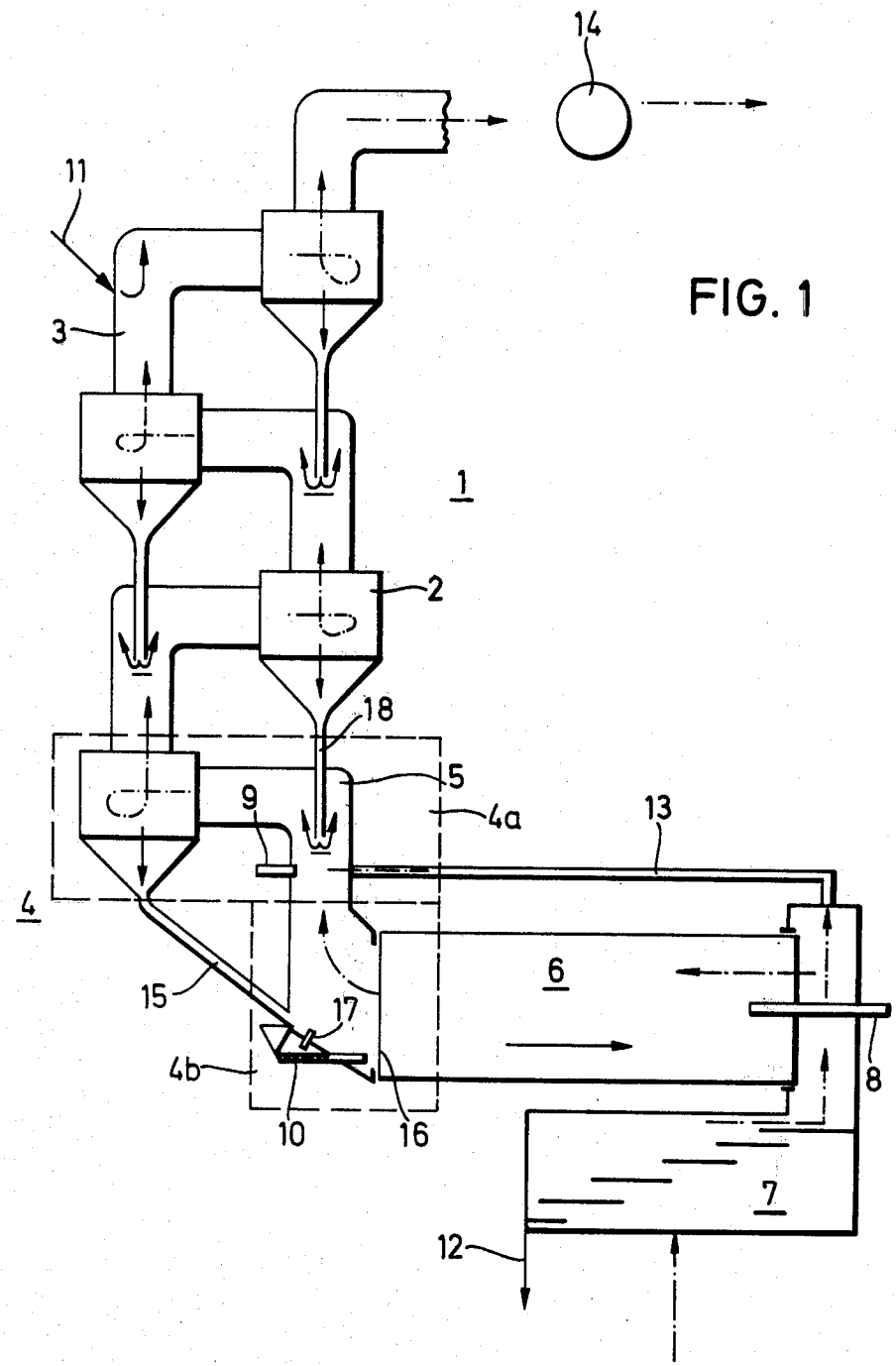
FIG. 1 illustrates rather schematically a cement installation with cyclone heat exchangers and a rotary kiln, with a two-stage separate calcination interval.

In accordance with the present invention, at least partially calcined particles of raw material in the first stage of the separate calcination process are separated from the stream of hot gas and further deacidified with the aid of pelletized and briquetted fuel in a rotary kiln, whereby the finely divided fuel burns out more rapidly in comparison with the fuel briquettes. In the second process stage, therefore, a substantial heat contribution is available to achieve almost complete calcination of the material, and such complete calcination is effected through the heat still contained in the slowly burning fuel briquette. The heat contributed by the fuel is taken up by the material exactly at the place and in the amount which are best suited to its thermal and chemical process condition. The duration time of treatment of the material particles is therefore extended to an optimum value at high temperature levels in the separate calcination process both in the first and second process states. Raw meal agglomerations and deposit formations are almost completely prevented by the optimum utilization of these solid fuels.

In the preferred form of the invention, the relatively uniformly sized fuel pellets have a particle size of less than 10 mm and preferably a size between 4 and 5 mm so that at the temperatures prevailing in the furnace exchange system, complete burning up of the fuel in the separate calcination process is reliably insured. The larger fuel briquettes have a size of less than 100 mm and preferably have a particle size between 30 and 60 mm whereby it is assured that the fuel may be reliably burned out in the second process stage of the separate calcination. In the case of the coarsely broken fuel, this fuel is also broken to a granulation size below 100 mm, and preferably between 10 and 40 mm.

In a further preferred embodiment of the invention, an adjustable partial quantity of the raw meal discharged from the first process stage of the separate calcination and at least partially deacidified therein is conveyed back into the first process stage and this raw material during its return is brought into intimate contact with at least a partial quantity of the smaller sized, pelletized fuel. This partial quantity of raw meal is intimately mixed with the particles of fuel in the hot furnace gas stream for a relatively long burning period so that the fuel heat is transferred uniformly to the raw meal. There results an optimizing of the burning out extent of the first process stage of calcination. There also results a longer duration time at which the material is subjected to heat transfer.

The invention also provides an apparatus for carrying out the process in which the hottest stage of a suspension gas heat exchanger is connected in series with the inlet of a calcination furnace, preferably a rotary kiln. The discharge means connecting the hottest stage with the calcination furnace is used as a pre-calcination stage for rapidly oxidizing fuel components. A rotary kiln, in advance of the sintering zone, provides a second calcination stage for slowly oxidizing fuel components. The first and second calcination stages may have a common fuel supply device which is provided in the furnace inlet chamber or in the area of the material inlet into the rotary kiln. In the base of the furnace inlet chamber or in the orifice area of the material discharge conduit of the hottest heat exchange stage there is provided at least one deflecting member in the material stream. With a simple construction, there results an optimizing of the burning interval of the first process stage of the separate calcination process. The fuel burning interval may, if necessary, commence directly in the furnace inlet chamber so that the burning interval may be carried out for substantially shorter periods compared to previously used constructions, thereby making it possible to reduce the total structural height of the installation. The second process stage of the separate calcination process ends where the sintering zone in the rotary kiln begins.

The invention will be explained in greater detail in connection with the attached sheets of drawings which illustrate preferred embodiments.

In FIG. 1 there is shown an installation for the thermal treatment of raw meal for the production of cement by means of hot gases, including a heat exchanger 1 of the suspension gas type, the heat exchanger consisting of several cyclones 2 in superimposed relationship in conventional manner. The cyclones are interconnected by means of gas conduits 3. In the uppermost gas conduit 3, at an inlet indicated at reference numeral 11, the raw material is introduced. In the heat exchanger, the calcination stage is indicated generally at reference numeral 4 and consists of a first calcination stage 4a for rapidly oxidizing fuel components such as gases or oils, and a second calcination stage 4b for slowly oxidizing fuel components as for example solid fuels.

A material discharge conduit 18 from the cyclone 2 is connected in series with the lowermost cyclone of the heat exchanger 1 and leads into an exhaust gas conduit 5 extending from a furnace inlet chamber 16 of a rotary kiln 6 to the lowermost cyclone of the heat exchanger system. With this exhaust gas conduit there is provided a conduit 13 through which combustion air is supplied to the first calcination stage 4a which may consist of both fresh air from the environment as well as hot exhaust gases from the cooler air exiting from a clinker cooler 7. The clinker cooler is connected in series with a rotary kiln 6. A fuel supply 8 introduces fuel into the rotary kiln. The heat exchanger system is supplied with an exhaust gas blower 14.

The first and second calcination stages 4a and 4b each have fuel supply devices 9 and 10, respectively, the fuel feed device 10 consisting, for example, of a worm conveyor and a suitable fuel charging container arranged on the furnace inlet chamber 16. In the base of the furnace inlet chamber, and in front of the fuel supply device 10, there is located in the material discharge conduit 15 a deflecting member 17 which projects generally transversely to the direction of movement of the stream of material in the discharge conduit 15. The depth of penetration of the deflecting member 17 is adjustable, either by hand, or by suitable apparatus.

With the utilization of solid fuel for the second calcination stage 4b, a mixture of similarly sized fuel pellets and similarly sized fuel briquettes is introduced through the fuel supply device 10 into the furnace inlet chamber 16. Upon the introduction of the fuel mixture, and depending on the flow velocity of the hot furnace exhaust gases, a part of the fuel pellets from the fuel mixture is carried away by the furnace exhaust gases into the first calcination stage 4a of the separate calcination process. By means of the deflecting member 17, a partial quantity of the raw meal is deflected out of the stream of raw meal going into the furnace exhaust gas stream and is picked up by the latter. The fuel pellets and the partial quantity of the precalcined raw material brought into circulation are intimately intermixed, and the fuel burning out in the oxygen containing furnace exhaust gas atmosphere gives off its heat to the partially calcined raw meal thus brought into circulation and to the preheated raw meal introduced through the material conduit 18 into the furnace exhaust gas conduit 5. The calcined raw meal is subsequently separated from the exhaust gases in the lowermost cyclone of the suspension gas heat exchanger, passes through the material discharge conduit 15 and reaches the furnace inlet chamber 16 of the rotary kiln 6. The fuel mixture of supplied fuel pellets and fuel briquettes remains to a substantial extent in the raw material load, whereby the fuel pellets burning out in the oxygen containing hot furnace atmosphere rapidly make available a great quantity of heat for the further calcination of the material. The fuel briquettes burn out more slowly and bring about the complete calcination of the raw meal before the latter arrives in the sintering zone of the rotary kiln. In the sintering zone, cement clinker is burned and subsequently cooled in the material cooler 7. The cooled clinker is removed by means of a discharge line 12 and is transferred to a suitable after-treatment, not shown in greater detail.

Suitable solid fuels may, for example, be high-grade pit or mineral coal which is pelletized or briquetted from pit coal sludges. It is also possible to intermix high-grade solid fuels with one another as, for example, coke-gravel, anthracite, hard coals, lignite or petroleum coke and select the fuel components proportionately so that similarly sized fuel fractions evidence a predetermined calcination behavior. Likewise, high-grade fuel components with low-grade and coarse and fine portions of these fuels may be provided in predetermined ratios in order to influence or change the characteristics of the solid fuels so as to adjust the amount of heat given off to be optimum for the raw meal in the various steps of the method.

Figure 2:
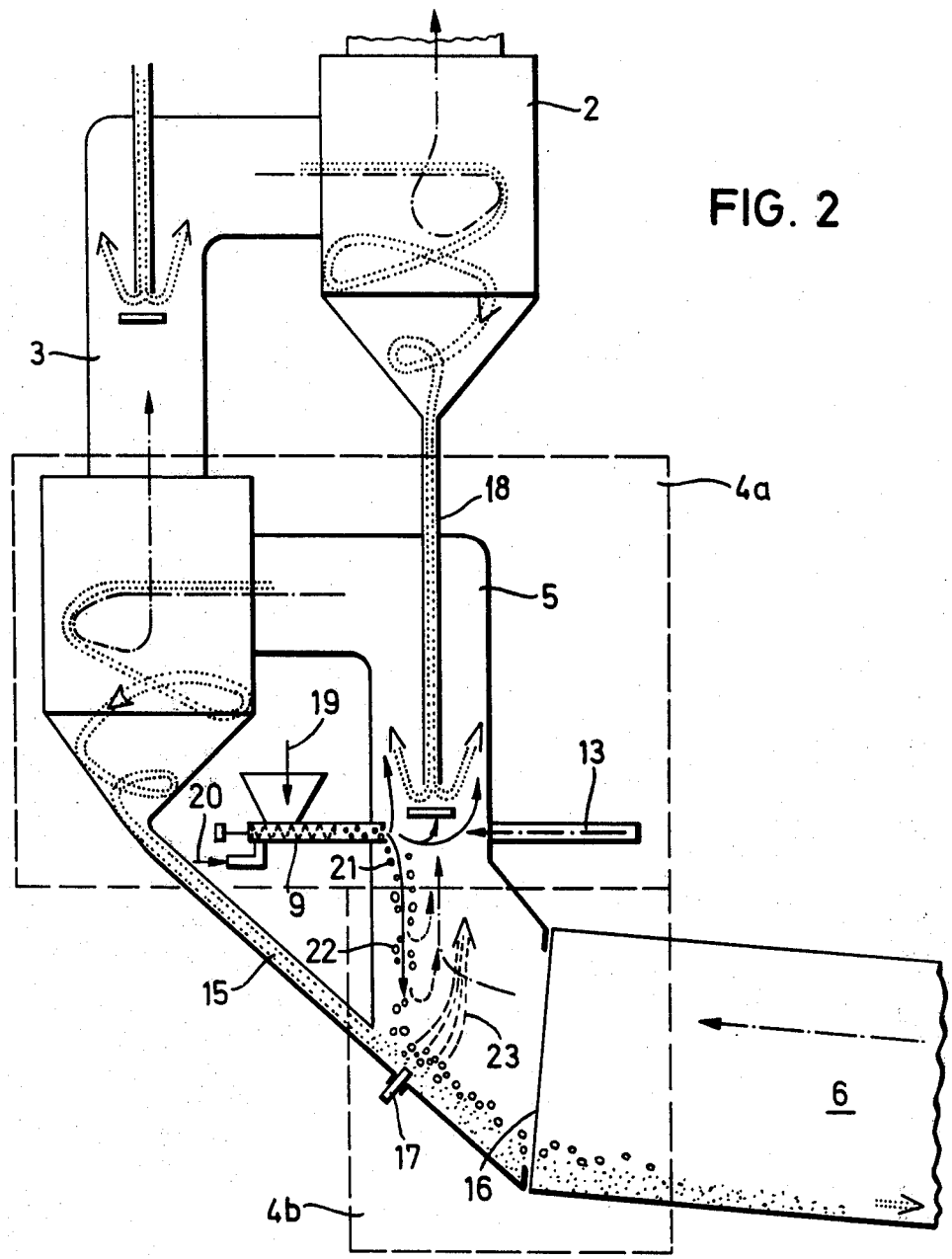
FIG. 2 is a further embodiment of the separate calcination interval.

Turning now to FIG. 2, in which similar reference numerals have been used, where appropriate, from FIG. 1, there is shown a material inlet 19 for similarly sized fuel pellets and fuel briquettes being introduced into the first calcination stage 4a. Rapidly oxidizing fuel components as, for example, combustion gases or gas oils, may be introduced through a fuel inlet 20. In each case, separate fuel supply devices for the solid and gaseous fuels may be used for introducing the same into the first calcination stage 4a. The rapidly oxidizing fuel burns during the feed of oxygen from the air conduit 13 into the calcination zone 4a in the direct vicinity of the raw meal introduced from the material conduit 18 into the furnace exhaust gas conduit 5 where it is finely dispersed in the hot furnace exhaust gases. The heat liberated in the calcination provides for substantial calcination of the material preheated in the upper cyclone stages of the heat exchanger. This material is conveyed along by the hot gas stream in the first calcination stage 4a and separated in the lowermost cyclone of the heat exchanger from the hot gases and is conveyed through the material discharge conduit 15 into the furnace inlet chamber 16. In this chamber, with the aid of the deflecting member 17, a partial quantity of the material is deflected into the hot furnace exhaust gas stream and is carried by the latter into the calcination stage 4a.

Fuel pellets 21 introduced into the first calcination stage 4a and fuel briquettes 22 fall by gravity against the direction of flow of the furnace exhaust gases through the furnace exhaust gas conduit 5 into the furnace inlet chamber 16 where it encounters the material bed. A part of the fuel pellets and proceeding downwardly in the furnace inlet chamber is burned out substantially and thereby loses so much in weight that the fuel pellets are decelerated by the upward forces of the hot furnace exhaust gases and are also deflected to be carried back into the calcination stage 4a. During this procedure, the fuel pellets undergo an intimate intermixture with the material as indicated by the blow lines 23 and by means of the deflecting member 17 are recirculated in the furnace exhaust gas conduit. Consequently, the heat given off by the fuel pellets is taken up by the recirculated and already partially calcined material for further calcination, so that the calcination stage 4a extends up to the furnace inlet chamber.

The remaining fuel pellets give off their combustion heat completely to the material in the area of the furnace inlet chamber. The fuel briquettes, on the other hand, pass through together with the material into the rotary kiln and thereupon slowly burn out. The heat liberated thereby is taken up by the material for complete calcination, before the material reaches the sintering zone. Consequently, there is made available to the raw material a quantity of heat which may endothermically be taken up by the material. With a minimum use of heat, an optimal calcination of the raw material may be attained without causing material agglomeration because of local heat transfer conditions.

The invention is not limited to the embodiments shown and described by way of example. Thus, the size of the fuel pellets and the flow velocity of the hot furnace exhaust gases in the area of the first calcination stage 4a may be adjusted such that the entire quantity of the fuel pellets introduced into the first combustion stage 4a drop into the furnace inlet chamber and are deflected shortly above the material surface by the hot gases so that they are carried back into the first calcination zone 4a. This provides a calcination zone for the recirculated material in the furnace inlet chamber. Incompletely burned fuel pellets are then separated out of the gas stream with the partially calcined material in the lowermost cyclone of the heat exchanger, are intimately intermixed with the material, and subsequently burned in the hot furnace atmosphere.

We claim as our invention:

1. In a method for the thermal treatment of finely divided material for the calcination of cement in a process in which:
    said material is preheated in a heat exchanger and later passed to a calcining furnace,
    said material is partially deacidified in a pre-calcination zone before entering said calcining furnace, the further calcining and sintering of the material being completed in said calcining furnace,
    in which rapidly oxidizing fuel components are burned in said pre-calcination zone in a first stage and more slowly oxidizing fuel components are combined with the partly calcined material from said first stage in a second stage and then sintered, the improvement which comprises:
    utilizing as said more slowly oxidizing fuel a mixture of granulated fuel of substantially uniform size and larger particles of briquetted or coarsely broken fuel.

2. A method according to claim 1 in which:
    the granulated fuel is composed of materials having particle sizes less than 10 mm.

3. A method according to claim 2 in which the granulated fuel is composed of materials having particle sizes of between 4 and 5 mm.

4. A method according to claim 1 in which:
    said larger particles are less than 100 mm in dimension.

5. A method according to claim 1 in which:
    said larger particles consist of briquettes having sizes of from 30 to 60 mm.

6. A method according to claim 1 in which:
    said larger particles consist of coarsely broken fuel having particle sizes of between 10 and 40 mm.

7. A method according to claim 1 in which:
    a portion of the partially deacidified material from said first stage is returned to said first stage and admixed with some of said rapidly oxidizing fuel components.

* * * * *